(No Model.)

J. C. BAYLES.
SHEET METAL PIPE.

No. 455,539. Patented July 7, 1891.

Attest:
F. C. Fischer.
L. Lee.

Inventor.
James C. Bayles, per
Crane & Miller, Attys.

UNITED STATES PATENT OFFICE.

JAMES C. BAYLES, OF EAST ORANGE, NEW JERSEY.

SHEET-METAL PIPE.

SPECIFICATION forming part of Letters Patent No. 455,539, dated July 7, 1891.

Application filed May 1, 1890. Serial No. 350,123. (No model.)

*To all whom it may concern:*

Be it known that I, JAMES C. BAYLES, a citizen of the United States, residing at East Orange, Essex county, New Jersey, have invented certain new and useful Improvements in Sheet-Metal Pipes, fully described and represented in the following specification and the accompanying drawings, forming a part of the same.

The object of this invention is to furnish a cheap and effective means of fitting the ends of sheet-metal pipes for union with cast-metal coupling-sleeves; and the invention consists in a new article of manufacture formed of a sheet-metal pipe, with an integral flange upon its end divided into segmental spiral wings. Such wings adapt the pipe for coupling with a cast-metal sleeve, having upon its inner side spiral bearing-seats and sloping guide-lugs adjacent to such seats to press the faces of the spiral wings against such spiral seats when the pipe end is turned within the sleeve. To form a tight joint between the pipe and sleeve, a packing of fusible metal or cement is then inserted within the sleeve around the neck of the pipe behind the spiral wings. With this construction the spiral wings do not produce a tight joint with the bearing seats inside the sleeve, but they operate to stiffen the end of the pipe and to hold the coupling firmly to the pipe independent of the packing. The packing is thus protected from many jars and from becoming loosened much more effectively than if the union of the pipe and sleeve were effected wholly by the packing.

Figure 1:
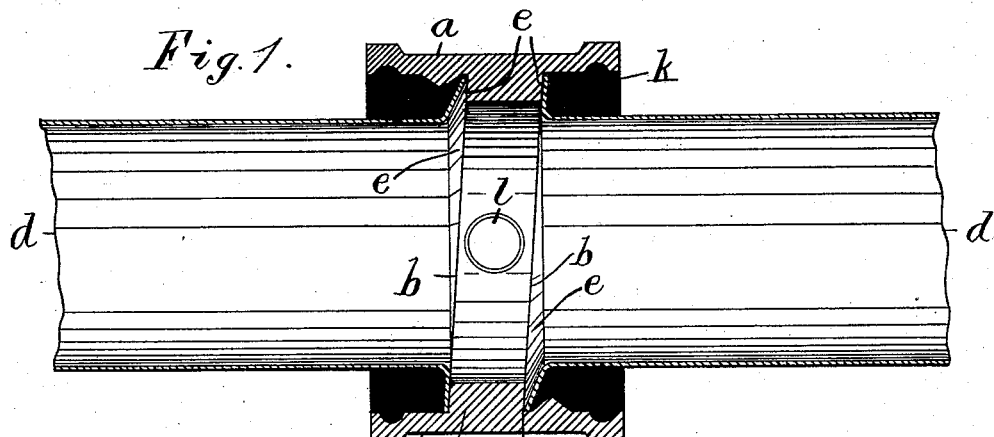
Figure 2:
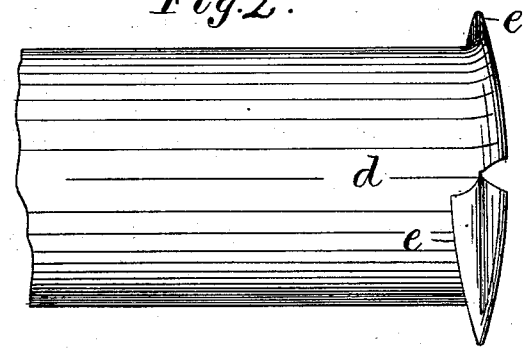

In the drawings, Figure 1 is a longitudinal section of two pipe ends united by a double-hub coupling. Fig. 2 is a side view, and Fig. 3 an end view, of the pipe with spiral segmental wings.

The wings are formed upon the pipe $d$ by turning a flange of suitable width upon its end, cutting two or more notches $f$ in the flange, and bending the segmental portions $e$ between the notches spirally. An accurate shape for the flanges is readily obtained by slipping upon the pipe behind the flange a cast-iron former, against which the flanges may be hammered by a mallet. Such method of constructing the flanges is especially adapted to pipes formed of thin malleable sheet metal, as steel or wrought-iron of good quality. By such method of construction the base of the wing (indicated by the line $c'$ in Fig. 2) is substantially at right angles with the axis of the pipe, and the degree of twist which can be imparted to the flange is limited by its projection from the pipe. The number of wings formed at the end of the pipe may be increased with pipes of increasing dimensions to avoid bending each wing too much in forming the spiral.

In Fig. 1, $a$ is the coupling-sleeve $b$ are bands formed within the same, the opposite faces of which furnish spiral bearing-seats to fit the faces of the segmental flanges $e$. $c$ are sloping guide-lugs adjacent to the spiral bearing-seats, and $k$ is a packing inserted within the sleeve to form a water-tight joint between the same and the neck of the pipe.

Any number of the segmental spiral wings may be formed upon the end of the pipe, and a corresponding number of separate spiral bearing-seats would be formed within the coupling-sleeve, with separate guide-lugs $c$ adjacent to the same.

The construction of the coupling is fully set forth and claimed in my application, Serial No. 365,864, filed September 22, 1890.

The couplings are applied to the pipes by screwing them over the pipe ends, and where two spiral wings $c$ only are provided upon the pipe a half-turn only is required to draw the flanges $e$ into close contact with the spiral bearing-seats $b$ as the wings are crowded by the sloping guide-lugs toward the bearing-seats. The pipe is secured to the sleeve by any suitable packing $k$, and it will be understood that the packing is intended only to form a tight joint, as the spiral ribs $c$ operate to hold the flanges $e$ firmly within the coupling independent of such packing.

Many devices have been invented to connect thin sheet-metal pipes with coupling-sleeves by a cemented or calked metal packing; but my invention imparts a much greater stiffness to the end of the pipe than the small beads or corrugations that have been heretofore employed in connection with such packings.

Figure 3:
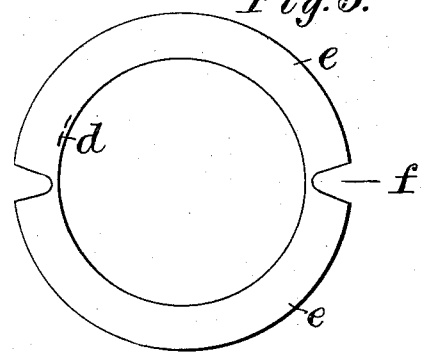

As will be evident by an inspection of Fig. 3, the spiral flanges $e$ stiffen the pipe end almost as much as a continuous circular flange, and thus impart a great deal of rigidity to the pipe end to resist the pressure of the packing, while their engagement with the guide-lugs $c$ and the bearing-seats $b$ lock the pipe end firmly within the sleeve independent of the packings.

Having thus set forth my invention, I disclaim the coupling shown herein, as it is shown in my application Serial No. 365,864, and claim the pipe only, as follows:

As a new article of manufacture, a sheet-metal pipe having an integral flange bent upon its end and divided into segmental spiral wings to adapt the pipe for coupling with a suitable sleeve, as and for the purpose set forth.

In testimony whereof I have hereunto set my hand in the presence of two subscribing witnesses.

JAMES C. BAYLES.

Witnesses:
THOS. S. CRANE,
WM. H. MITCHELL.